May 11, 1965    J. L. SPRAGUE ETAL    3,182,376
SILICON DIOXIDE CAPACITOR
Filed Feb. 21, 1963

INVENTORS
John L. Sprague
and Otto J. Wied
BY Connolly and Hutz
ATTORNEYS

United States Patent Office 3,182,376
Patented May 11, 1965

3,182,376
SILICON DIOXIDE CAPACITOR
John L. Sprague and Otto J. Wied, Williamstown, Mass., assignors to Sprague Electric Company, North Adams, Mass., a corporation of Massachusetts
Filed Feb. 21, 1963, Ser. No. 260,136
7 Claims. (Cl. 29—25.41)

This invention relates to a solid capacitor having a silicon dioxide dielectric on a porous electrode, and more particularly to a method for producing a porous-pellet solid capacitor in which the dielectric film is silicon dioxide.

It is considered to be desirable to provide a capacitor having a very thin layer of a high surface area of silicon dioxide as the dielectric film combined with reasonable structural strength in the finished capacitor body.

It is an object of this invention to provide a simple method for producing a high surface area of silicon dioxide dielectric on a conductive base.

It is a further object of this invention to provide a solid capacitor having a high surface area of silicon dioxide dielectric film and good electrical contact to this high surface area.

Figure 1:
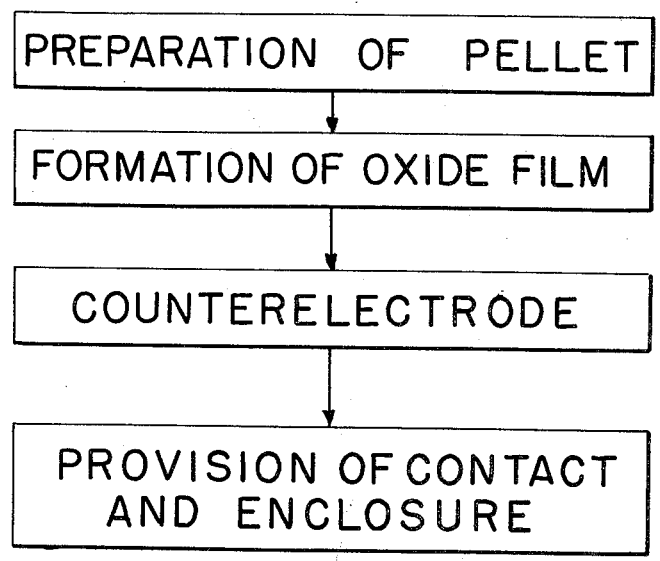
Figure 2:
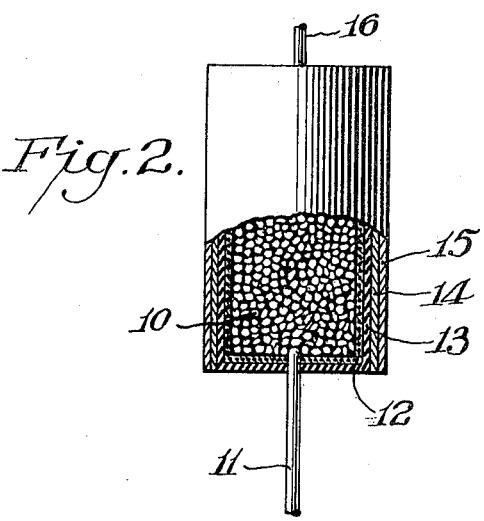

These and other objects of this invention will become more apparent from the following description taken together with the accompanying drawings, in which:

FIGURE 1 is a block chart identifying steps of producing a capacitor according to this invention; and FIGURE 2 is a side view partially in section of a capacitor according to this invention.

In general, this invention comprises a method for providing a sintered conductive base of high surface area carrying a silicon dioxide dielectric film which has in contact therewith a material for providing good electrical contact to thereby form an efficient capacitor.

More particularly, the capacitor of this invention has a conductive base made up of sintered particles of conductive material. On these sintered particles there is produced a silicon dioxide dielectric film. The silicon dioxide dielectric film is continuous so as to be virtually flawless and yet extremely thin. The dielectric film extends across the large surface area of the sintered base to provide an extensive capacitor interface. The base is conductive and a suitably conductive material is placed in electrical contact with the extensive surface of the dielectric film. This conductive material in turn is contacted by an electrically conductive termination to complete the capacitor construction.

Referring to the flow sheet of FIGURE 1, the first step is the preparation of the base pellet. The base pellet is made up of sintered particles of a suitable conductive material. One method of preparing this base pellet is by pressing suitable silicon particles into a green body which is then sintered into a coherent porous pellet. A terminal lead is embedded in the pressed green body before sintering. Pressing and sintering according to known techniques in the powder-metallurgy art to produce a body of approximately half the density of elemental silicon provides a suitable degree of porosity to accomplish the desired result of providing a very high surface area.

Another method of forming the base pellet is by sintering together particles of a metal that is compatible with a thin silicon dioxide coating. Germanium, molybdenum, tungsten, stainless steel, tantalum, and niobium are examples of metals which may be suitably sintered as base pellets for silicon dioxide coatings.

Another means for providing a suitable base pellet is by pressing and sintering metal-coated particles. Again, the coating must be of a metal that is compatible with a thin silicon dioxide coating, as set forth above. For example, a sintered tantalum pellet may comprise substantially uniform minute particles of an inert refractory material covered with a continuous film coating of elemental tantalum. Ceramic particles smaller than about 5 mils in size are provided with relatively thick continuous metallic deposition of elemental tantalum, at least about 1/10 mil thick. The tantalum coating is preferably deposited in a surface catalyzed chemical reaction. The coating process is a vapor phase reaction that is catalyzed by the hot ceramic surfaces, and is produced by passing a reducing gas over the heated ceramic particles after contacting the gas with a tantalum compound that is reducible to elemental tantalum. The ceramic particles are heated to a temperature at which the reduction takes place, and the tantalum compound is heated to facilitate pick-up by the carrier gas. The hot ceramic surface catalyzes the vapor phase reaction between the volatile tantalum compound and the reducing gas. The tantalum coated ceramic particles when pressed and sintered together into a porous mass make up a base pellet which with a suitable terminal lead serves as an electrode for the reception of the silicon dioxide dielectric film of the capacitor of this invention.

Referring to FIGURE 1, it is seen that the second step of this process is the production of the oxide dielectric film. The silicon dioxide film may either be applied directly to the pores of the pellet, or formed in place on the pellet. For example, the silicon dioxide film may be formed from the silcon particles making up the base pellet. Thermal oxidation of the silicon in steam forms a layer of amorphous silica over the irregular surfaces. By another suitable means the sintered pellet of silicon particles are made the anode in an electrolytic bath and silicon dioxide film is formed on the irregular surfaces of the silicon by anodization through electrolysis. Production of the silicon dioxide film on the surfaces of the sintered silicon pellet can be accomplished by combining the thermal oxidation and the film formation by anodization.

The silicon dioxide film is also applied to the surfaces of a pellet by a method which consists of passing an organo-oxy-silane over the pellet at around 750° C. The silicon dioxide which is thus formed deposits out onto the pores of the pellet as an adherent flexible layer which is in intimate contact with the surfaces of the pellet.

A typical organo-oxy-silane decomposition reaction for producing a deposited layer is as follows in the case of ethyltriethoxysilane:

$$C_2H_5-Si(OC_2H_5)_3 \xrightarrow{\Delta} SiO_2 + C_xH_y + \text{[possibly some SiO and C]}$$

The decomposition of silanes having 3 or 4 oxygen atoms per molecule is preferred for optimum results. Other suitable silanes include tetraethoxysilane, amyltriethoxysilane, vinyltriethoxysilane, phenyltriethoxysilane, dimethyldiethoxysilane, and diphenyldiethoxysilane.

This application of the silicon dioxide film to the pellet in which the silicon dioxide is itself produced directly as it is applied is useful both in producing silicon dioxide films on the surfaces of a base pellet of sintered silicon particles and a base pellet of conductive particles other than silicon, such as the metal or metal-coated particles described above. The thin film of silicon dioxide of this invention assumes an intimate and thorough contact with the extensive surfaces of the porous pellet.

The silicon dioxide film can also be produced in accordance with this invention from a layer of silicon applied to a pellet surface by deposition from the vapor phase, for example, by the hydrogen reduction of $SiCl_4$. A silicon dioxide film can then be formed on this silicon layer by thermal oxidation and/or anodization in similar fashion to that described above in connection with the production of the silicon dioxide film on the sintered silicon particles. This technique is particularly appropriate in the production of a silicon dioxide film on the surfaces of the base pellet of sintered conductive particles other than silicon.

As shown in the flow sheet of FIGURE 1 the film formation step is followed by the steps of application of the counterelectrode, contacting the counterelectrode with an electrically conductive coat, attaching a suitable terminal lead to complete the capacitor body, and then suitably protecting the capacitor body by a casing or encapsulation.

The porosity of the base pellet of sintered particles furnishes an extensive surface area. The dielectric is the thin film of silicon dioxide formed in one way or another on this surface area. The counterelectrode of the capacitor of this invention is in intimate and continuous contact with this thin dielectric film. The counterelectrode is suitably conductive and extends into the interstices of the pellet to contact the dielectric film throughout the pores. The conductive material of this second electrode is in turn contacted by a suitable electrically conductive coat, such as a suitable metal. The terminal lead in turn is attached to this coat.

FIGURE 2 shows a capacitor embodiment of this invention partially in section. An electrode pellet 10 has terminal lead 11 embedded in good electrical contact in the sintered particles. The sintered particles may be silicon particles or they may be other suitably conductive particles, such as metal or metal-coated particles. A dielectric silicon dioxide film 12 overlies the exposed surface area of the particles within the pores of pellet 10. A conductive material penetrates the pellet and is applied to the dielectric film 12 to form a second or counterelectrode 13. The capacitor body is completed by an outside metal contact coating 14, a suitable enclosure 15, and an attached terminal lead 16. As shown in FIGURE 2 the conductive material for the counterelectrode 13 permeates the interstices of the porous pellet 10 so that electrode 13 is in intimate contact with all portions of dielectric film 12, and also presents an outer surface for receiving the conducting contact coat 14.

One suitable conductive material for electrode 13 may be produced from a conducting organic material. Suitable materials for application to the film 12 are organic transfer-type complexes having suitable resistivities. Suitable materials and their preparation are those recited by S. D. Ross et al. in application for U.S. Letters Patent S.N. 117,921 filed June 19, 1961. The organic charge-transfer complex is impregnated into pellet 10 as a solution. The preferred solvents have boiling points which permit their removal to temperatures that will not harm the silicon dioxide film.

Another method for producing a conductive material within the interstices of the porous anode is by impregnation of a decomposable compound in liquid form into the pellet and subsequently converting the impregnated compound to a suitably conductive material 13. For example, manganous nitrate may be impregnated in solution, dried and then pyrolytically converted by heating at temperatures of from about 180° C. up to about 450° C., as disclosed by R. J. Millard in U.S. Letters Patent 2,936,514, to produce a layer of manganese dioxide in intimate contact with silicon dioxide film 12. The decomposable compound must be heated to bring about a complete conversion to the conductive material, such as manganese dioxide. Accordingly, one way for effectively producing the conductive material is by successive impregnations of the decomposable compound and conversion of the compound by pyrolysis to build up the conductive material 13 on the dielectric film 12.

Another method of applying conductive material 13 is by the thermal composition of a metal carbonyl, such as nickel or silver carbonyl, to deposit the metal in and on the pellet 10 and to form the electrode 13. The separation of the metal from its volatile gaseous carbonyl compound takes place in the presence of the heated pellet and the metal deposits on the surface of the silicon dioxide film, to which the deposited metal readily adheres. The carbonyls of iron, molybdenum, chromium, cobalt, tungsten, ruthenium and nickel are volatile under vacuum at above room temperature. They may be applied to the silicon dioxide film 12 under a pressure of a few millimeters to mercury by a vapor phase deposition. The silicon dioxide becomes the substrate for the deposited metal which extends over the surface of the silicon dioxide film 12. The carbonyls of the above metals vary in decomposition temperature and minimum decomposition temperatures range from 50° C. to around 180° C. Nickel, which is particularly useful, will deposit on the surface of the pellet when it is heated at around 180° C. in a gaseous atmosphere of nickel carbonyl. The nickel is gas plated across the surface of the silicon dioxide film throughout the pellet 10 while carbon monoxide is liberated.

A further method of depositing the conductive material from a metal carbonyl is by first depositing on the silicon dioxide dielectric film a decomposition catalysis material and then subsequently decomposing a metal carbonyl compound upon the catalyst layer. This deposition may be carried on at lower temperatures. This procedure provides a thorough coverage of the dielectric film including a penetration into the crevices and pores of the pellet. Thus, there is insured an intimate contact of the deposited metal on the porous pellet surfaces. Further, the decomposition of the metal carbonyl on the catalyst layer insures an in situ production of the conductive material on the dielectric film, which in turn further insures the intimate contact between the conductive material and the dielectric film. There is formed an extremely fine conductive layer corresponding precisely to the dielectric film with which it is in intimate contact.

Suitable catalysts are particles of nickel, cobalt, silver, gold, copper, or the like, deposited in the interstices of the pellet on the dielectric film. The catalyst is applied to the dielectric film surface by dip coating the pellet in a system containing the catalytic material. The metal carbonyl employed is one suitable for this plating, such as nickel carbonyl; other suitable carbonyls include $$CoH(CO)_4, Ru(CO)_5, RhH(CO)_4, Os(CO)_5$$
$$[Rh(CO)_4]_2, [Co(CO)_3]_4, [Ir(CO)_4]_2, \text{ and }$$
$$[Ru(CO)_3]_4$$

The metal carbonyls will deposit out on the surfaces of the pores of the sintered pellet as metal through decomposition by contacting the deposited catalyst in a temperature range of from around 40° C. to 110° C.

Another method for providing a conductive material in intimate contact with the dielectric film 12 is by utilizing suspensions of metal particles. A silver composition may be introduced into pellet 10 in a vehicle or thinner so as to impregnate the interstices. The electrode 13 formed by the firing of the silver composition extends throughout the pellet in intimate contact with the film 12 and is receptive to the electrical contact coating 14.

In a still further method, the conductive material may be plated on the silicon dioxide film by electroless plating. The dielectric film surface is prepared for the plating by activation. This activation may take the form of successive immersions in suitable salt solutions at about room temperature. Such activation is described in the National Bureau of Standards (USA Circular 529, page 25) May 22, 1953. The plating of the conductive material on the oxide dielectric film is then carried out by a surface catalyzed chemical reduction plating. Silver, nickel, cobalt and palladium are suitable metals for this deposition. Suitable baths both acid and alkaline for plating nickel on the dielectric film are described in U.S. Bureau of Standards Circular March 1, 1958.

Electrode 13 is adapted to connect to external circuitry through electrically conductive coat 14 and suitable attachments such as the metal casing 15 and terminal lead 16. The electrically conductive coat 14 is applied in the fashion of applying any suitable conducting material as a conductive plate for a capacitor. The conducting material may be applied either in a paste or liquid form, such as by dipping in a fashion similar to tinning, spraying, as with metallic paint, or painting with a brush. Further, the conductive layer may be applied by evaporation or vapor deposition in a vacuum.

Among the outstanding features of this invention are the attainment of high capacity, electrical stability and life in a non-polar capacitor construction combined with exceptional structural strength. It will be apparent to those skilled in the art that various modifications may be made without departing from the principles of the invention as disclosed herein.

Numerous variations and modifications in the preferred methods and examples described will be readily apparent and may be made without departing from the spirit and scope of our invention as defined in the following claims.

What is claimed is:

1. The method of producing a capacitor comprising the steps of providing a porous body of particles made up of a metal having a coefficient of expansion compatible with silicon dioxide, treating the irregular surfaces of said porous body to provide a film of silicon dioxide in intimate and thorough contact thereon permeating the porous body with a fluid capable of penetrating the interstices between the particles and contacting the surfaces of the film, depositing a conductive material obtained from said fluid into intimate contact on said film, and applying an electrically conductive connection to said conductive material.

2. The method of producing a capacitor comprising the steps of providing a porous body of particles coated with a conductive material having a coefficient of expansion compatible with silicon dioxide in intimate and thorough contact, providing a film of silicon dioxide on the irregular surfaces of said porous body permeating the porous body with a fluid capable of penetrating the interstices between the particles and contacting the surfaces of the film, depositing a conductive material obtained from said fluid in intimate contact on said film, and applying an electrically conductive connection to said conductive material.

3. The method of producing a capacitor comprising the steps of providing a porous body of particles coated with a conductive material having a coefficient of expansion compatible with silicon dioxide, applying a thin layer of silicon to the irregular surfaces of said porous body, treating said silicon layer to provide a film of silicon dioxide in intimate and thorough contact thereon, permeating the porous body with a fluid capable of penetrating the interstices between the particles and contacting the surfaces of the film, depositing a conductive material obtained from said fluid in intimate contact on said film, and applying an electrically conductive connection to said conductive material.

4. The method of producing a capacitor as claimed in claim 1 in which the porous body is permeated with a liquid containing in solution an organic transfer-type complex, said conductive organic transfer complex being deposited into intimate contact on said dielectric film from said solution by removal of the solvent.

5. The method of producing a capacitor as claimed in claim 1 in which the porous body is permeated with a metal carbonyl in a volatile gaseous form, said metal being deposited on the film by decomposition of the carbonyl at a temperature in the range of from 50° C. to around 180° C.

6. The method of producing a capacitor as claimed in claim 1 in which the porous body is permeated with a salt solution containing a metal, said metal being deposited into intimate contact on said film by surface catalyzed chemical reduction plating.

7. The method of producing a capacitor as claimed in claim 1 in which the porous body is permeated with a fluid precursor of a conductive material, said conductive material being deposited into intimate contact on said film by decomposition in situ of said precursor.

References Cited by the Examiner
UNITED STATES PATENTS

| | | | |
|---|---|---|---|
| 2,982,668 | 5/61 | Gunther | 117—106 |
| 3,029,370 | 4/62 | Hill | 317—258 |
| 3,094,650 | 6/63 | Riegert | 317—258 |

RICHARD H. EANES, JR., *Primary Examiner.*